US009384781B2

(12) United States Patent
Chen et al.

(10) Patent No.: US 9,384,781 B2
(45) Date of Patent: Jul. 5, 2016

(54) METHOD OF SPARSE REPRESENTATION OF CONTENTS OF HIGH-RESOLUTION VIDEO IMAGES SUPPORTING CONTENT EDITING AND PROPAGATION

(71) Applicant: BEIHANG UNIVERSITY, Beijing (CN)

(72) Inventors: Xiaowu Chen, Beijing (CN); Dongqing Zou, Beijing (CN); Qinping Zhao, Beijing (CN); Jianwei Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 106 days.

(21) Appl. No.: 14/332,813

(22) Filed: Jul. 16, 2014

(65) Prior Publication Data

US 2015/0030312 A1    Jan. 29, 2015

(30) Foreign Application Priority Data

Jul. 29, 2013    (CN) .......................... 2013 1 0322166

(51) Int. Cl.
*G11B 27/00*    (2006.01)
*H04N 5/93*    (2006.01)
*G11B 27/02*    (2006.01)
*H04N 1/60*    (2006.01)
*G06T 5/00*    (2006.01)
*G06T 11/00*    (2006.01)

(52) U.S. Cl.
CPC ................ *G11B 27/02* (2013.01); *G06T 5/001* (2013.01); *G06T 11/001* (2013.01); *H04N 1/60* (2013.01); *G06T 2207/10024* (2013.01)

(58) Field of Classification Search
CPC ....................................................... G11B 27/02
USPC ........................................................ 386/278
See application file for complete search history.

(56) References Cited

U.S. PATENT DOCUMENTS

2012/0147205 A1*    6/2012    Lelescu .............. H04N 13/0029
                                                    348/218.1

* cited by examiner

*Primary Examiner* — Hung Dang
*Assistant Examiner* — Girumsew Wendmagegn
(74) *Attorney, Agent, or Firm* — Global IP Counselors, LLP

(57) ABSTRACT

This invention provides a method of sparse representation of contents of high-resolution video images which supports content editing and propagation. It mainly comprises five steps which are: (1) to input the original images or videos of high resolution to summarize the characteristic information of their pixels; (2) to acquire the highly sparse samples of the original images or videos through the sparse representation technique; (3) to reconstruct each pixel of the input images or videos with a small number of the original sparse samples to calculate a coefficient of reconstruction; (4) to edit and propagate the original sparse samples to yield a result of new sparse samples; (5) to generate a result of final images or videos of high resolution according to the result of sparse samples and the coefficient of reconstruction. This invention only edits and propagates the highly sparse samples rather than all the information of pixels. Thus, the memory consumption can be greatly reduced so as to possibly process the images or videos of high resolution in a very small memory space. It is very potential to be widely applied in the fields of image processing, computer vision and augmented reality technique.

7 Claims, 6 Drawing Sheets

METHOD OF SPARSE REPRESENTATION OF CONTENTS OF HIGH-RESOLUTION VIDEO IMAGES SUPPORTING CONTENT EDITING AND PROPAGATION

TECHNICAL FIELD

The present invention belongs to the fields of image processing, computer vision and augmented reality technique, specifically relates to a method of sparse representation of contents of high-resolution video images which supports content editing and propagation.

BACKGROUND OF THE INVENTION

The interactive editing of video images is an important part of the field of video image processing. The editing and propagation of video image has been a focus of research in the field of computer vision. When an image or video is edited by a user, only a small number of the pixels are necessary to be edited. Other pixels can change accordingly as per the association relation established among various pixels and thus the effect of editing by user can be propagated to the whole image or video.

At present, some scientific researchers have carried out a large amount of studies on related techniques. As for the editing and propagation of image, Anat Levin et al. have put forward the framework regarding the method of editing and propagation of image for the first time in 2004. Extending this framework, Xiaobo An et al. raises a method of editing and propagation based on the similarity of all pixels in 2008. However, this method will consume too many memories and can't process the data of big image or video. Kun Xu et al. proposes a method of editing and propagation based on KD-tree in 2009 which establishes a relation between different pixels according to the distance of KD-tree between different pixels to realize the effect of propagation. Zeev Farbman et al. presents a method of editing and propagation based on diffusion distance (diffusion map) in 2010 which utilizes the diffusion distance to measure the similarity between different pixel points. Nevertheless, these methods can't process effectively the color transition region and the phenomena of color penetration and distortion often occur. Xiaowu Chen et al. raises a method of editing and propagation based on preserving local features and structures in 2012. This method can solve the problems of color penetration and distortion in color transition region. However, it still has great limitation in the consumption of memory and time. As a whole, in order to maintain the similarity among all the pixels during editing and propagation, a large amount of memory spaces have to be consumed. And the existing methods can't maintain a good sense of fidelity of result it the case of limited memory space and time.

With the advent and increase of high-resolution video images, the demand on processing technologies for such large-scale video images also starts to emerge. However, most of such existing techniques alike are based on a method of overall optimization and will inevitably led to excessive memory consumption and too long processing time. For example, a method of editing and propagation mentioned above raised by Xiaobo An, et al. of Dartmouth College of USA requires a memory space of about 23 GB during processing an image of 60 M pixels. It far exceeds the memory size of current ordinary computer and hence this technique is difficult to promote for application. Yong Li et al. of Tsinghua University of China proposes another method of editing and propagation of video images by which the consumption of memory can be improved though a color distortion is resulted. Thus, it is in an urgent need for a method of editing and propagation of video images which can maintain the fidelity of the result of video images with consuming very small memory.

In recent years, the sparse representation technique has already been applied in various fields such as the image analysis and understanding. Jianchao Yang et al. applies the sparse representation technique in image super-resolution and proposes a viewpoint to regard low-resolution image as the sparse sample of high-resolution image. In 2008, Julien Mairal et al. proposes a supervised learning framework based on multi-scale sparse representation to solve the problems of image denoising and padding. And Shenlong Wang et al. proposes a model of half-coupling dictionary learning in 2012 to solve the problem of image composition. In addition, the sparse representation technique is also widely applied in the fields of face recognition, image modeling and image classification, etc. However, no one has ever applied the sparse representation technique in the field of editing and propagation and focused it to solve the problem of memory consumption during processing high-resolution video images.

SUMMARY OF THE INVENTION (1) Purpose: In order to smooth away the drawbacks of existing techniques, the present invention is to provide a method of sparse representation of contents of high-resolution video images which supports content editing and propagation. This method utilizes the sparse representation technique to acquire the highly sparse samples of original video images and only edits and propagates the sparse samples rather than the information of all pixels. Thus, the memory consumption can be greatly reduced so as to process the images and videos of high resolution with relatively less memory space; meanwhile, the sparse representation technique is also used to obtain the reconstruction coefficient of the sparse samples and the original video images which can ensure an excellent visual effect and fidelity of the final result.

(2) Technical solution: in order to realize the purpose, the technical solution employed by the present invention is:

A method of sparse representation of contents of high-resolution videos images supporting content editing and propagation, which comprises the specific steps as follows:

Step 1: to input the original high-resolution images or videos and summarize the characteristic information of their pixels and remove the pixels of same characteristics;

Step 2: to acquire the highly sparse samples of the original images or videos through the sparse representation technique; utilize 11 basic colors to classify the pixels of the original images or videos into 11 types in terms of the Euclidean distance between the pixel color and each of 11 basic colors; extract separately the sparse samples from each of 11 types of pixels which can represent its nature feature and then combine 11 sparse samples acquired into the final sparse sample which contains the nature features of all the pixels of the original images or videos;

Step 3: to reconstruct each pixel of the input images or videos through a small number of the original sparse samples to calculate the coefficient of reconstruction; the number of the selected sparse samples to reconstruct each pixel is self-adaptive with a principle that a minimum quantity of samples are used to reconstruct the original pixel and the calculated reconstruction coefficient establishes a linear relation between the input pixel and the original sparse samples;

Step 4: to edit and propagate the original sparse samples to yield the result of sparse samples;

The editing and propagation of the original sparse samples comprises three methods as follows: interactive recoloring of video object, conversion of color style of video scene and seamless integration between object and scene;

Step 5: to generate the result of all the pixels according to the result of sparse samples and the reconstruction coefficient so as to yield the result of high-resolution images or videos.

Wherein: the "nature information of pixel" described in Step 1 comprises the RGB color characteristics and the XY position characteristics of a pixel.

Wherein: the "sparse representation technique" described in Step 2 is to acquire the sparse samples D and the reconstruction coefficient α through minimization of below formula;

$$\sum_i \|x_i - D\alpha_i\|_2^2 + \lambda \sum_i \|\alpha_i\|_0$$

In the formula above, the first term denotes the input pixel $x_i$ is reconstructed perfectly by the sparse samples D and the reconstruction coefficient α; the zero norms $\|\cdot\|_0$ in the second term denotes the number of nonzero terms in the coefficient vector α showing that the reconstruction coefficient α is highly sparse.

Where: the "11 basic colors" described in Step 2 refer to 11 colors as red, yellow, blue, green, purple, orange, pink, brown, grey, black and white.

Wherein: the "interactive recoloring of video object" described in Step 4 is a method of editing and propagation which comprises the steps as follows: to select the color of foreground brush to mark some pixels of the object(s) necessary to be recolored on the images or videos; to select the background brush to mark some pixels of the region(s) without color change on the images or videos; to calculate the Euclidean distance of color between the pixel of the sparse samples and the marked pixels and select the nearest pixel from the sparse samples to substitute the marked pixels to form new marked pixels; to map the marked foreground pixels to the foreground brush color and the marked background pixels to the color of themselves and then propagate the color change to all the sparse samples by means of manifold-preserving editing and propagation.

Wherein: the "conversion of color style of video scene" described in Step 4 is a method of editing and propagation which comprises the steps as follows: to extract the template(s) of primary color(s) of the sparse samples as the original template(s) of primary colors; to designate the objective template(s) of primary color(s); to select the sample(s) from the sparse sample(s) with the nearest Euclidean distance with the color(s) of the template(s) of the primary colors and substitute the template(s) of the primary template(s) to form the new template(s) of primary color(s); establish an one-to-one relationship between the new template(s) of primary color(s) and the objective template(s) of primary color(s) and propagate the color change to all the sparse sample(s) by means of manifold-preserving editing and propagation.

Wherein: the "seamless integration between object and scene" described in Step 4 is a method of editing and propagation which comprises the steps as follows: to select the pixel color of foreground object boundary as the sparse sample(s) and calculate the difference between the foreground color and the background color of the object boundary as the editing result so as to directly yield the result of editing and propagation.

(3) Advantages and effects: compared with the existing techniques, the advantageous features of the present invention are:

1. The present invention utilizes the sparse representation technique to acquire the sparse samples. The ratio between the quantity of sparse samples and the quantity of the original pixels can be as low as 0.01% and can further decrease as the increase of image resolution and video length.

2. The present invention only edits and propagates the sparse samples rather than the information of all pixels. Thus, the memory consumption can be greatly reduced so as to possibly process the high-resolution images and videos with relatively smaller memory space;

3. The present invention utilizes the spares representation technique to calculate the sparse reconstruction coefficient between the original pixels and the sparse samples and establish a linear relation between them. The reconstruction coefficient can be utilized to well maintain the color distribution of the original video images so as to generate effectively the result of whole video image with high quality.

4. The method brought forward by the present invention can be utilized in many applications with a significant effect, including interactive recoloring of video object, conversion of color style of video scene and seamless integration between object and scene.

Figure 1:
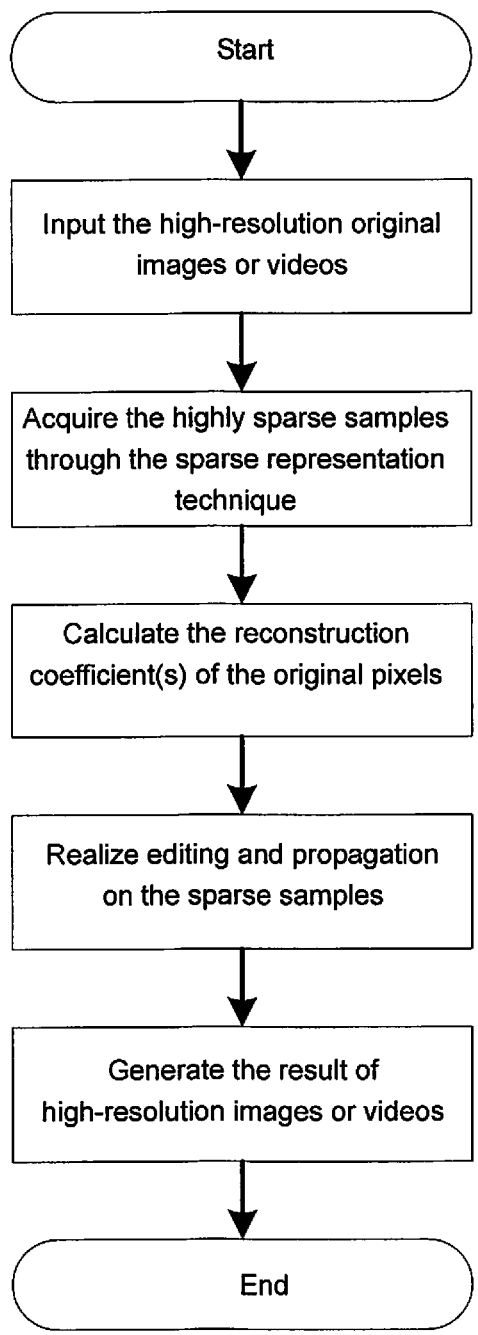
FIG. 1 is the flow block diagram of the method according to the present invention.

The symbols in the drawings are described as follows:
X: Input images or videos;
x: One pixel of input images or videos;
Y: Result of images or videos:
y: One pixel of result of images or videos;
n: Size of sparse sample(s):
D: Original sparse sample(s);
D̃: Result of sparse sample(s);
α: Coefficient of reconstruction;

DETAILED DESCRIPTION OF PREFERRED EMBODIMENTS

In order to clarify clearer the purpose, the technical solution and the advantages of the present invention, the method according to the present invention is described as follows in detail together with the drawings. It should be understood that the embodiments described here are used only to explain the present invention and shall not exercise any limit on the present invention.

The present invention brings forward a framework based on the sparse representation technique to acquire the highly sparse sample from the high-resolution video images, which allows only the highly sparse samples to be edited and propagated so as to realize the purpose of reducing memory consumption and to ensure a result of excellent video effect and fidelity via the reconstruction coefficient. Meanwhile, this framework is utilized in three typical applications including interactive recoloring of video object, conversion of color style of video scene and seamless integration between object and scene.

The present invention provides a method of sparse representation of contents of high-resolution video images which supports content editing and propagation. With reference to the flow chart of overall method as shown in FIG. 1, the embodiment is as follows:

Step 1: to input the original high-resolution images or videos and summarize the characteristic information of their pixels and remove the pixels of same characteristics;

Remove the pixels with same characteristic information from the high-resolution input video images and reserve only the pixels of different characteristic information so as to reduce the redundancy of information and prepare for acquiring the highly sparse samples.

As per the requirements of different applications including interactive recoloring of video object, conversion of color style of video scene and seamless integration between object and scene, different characteristics will be selected. Wherein, the characteristics of RGB color is selected for interactive recoloring of video object and conversion of color style of video scene; the characteristics of RGB color and XY position are selected for seamless integration between object and scene.

Step 2: to acquire the highly sparse samples of the original images or videos through the sparse representation technique; utilize 11 basic colors to classify the pixels of the original images or videos into 11 types in terms of the Euclidean distance between the pixel color and each of 11 basic colors; extract separately the sparse samples from each of 11 types of pixels which can represent its nature feature and then combine 11 sparse samples acquired into the final sparse sample. This sparse sample contains the nature features of all the pixels of the original images or videos.

Figure 2:
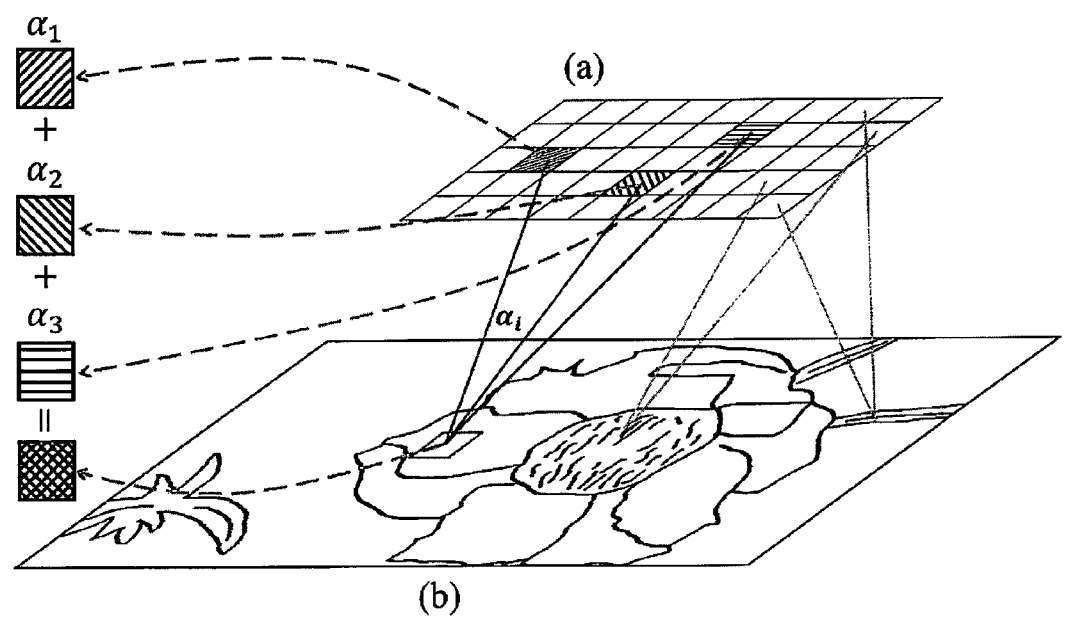
FIG. 2 is the schematic diagram of the present invention.

Specifically, with reference to the schematic diagram as shown in FIG. 2, (b) in FIG. 2 denotes the input high-resolution images or videos and (a) denotes the highly sparse sample. Any pixel in (b) can be expressed linearly by several samples in (a). The principle of mathematics to acquire the highly sparse samples of original images or videos through the sparse representation technique is as follows:

Supposing the vector $x_i$ is used to denote the characteristics of pixel i in the input video image and D to denote the sparse sample set to be solved with $D=\{d_1, d_2, \ldots, d_n\}$, where n denotes the sample size in the sparse samples and $\alpha$ denotes the reconstruction coefficient, then any pixel of the original video images can be linearly reconstructed by the sparse samples, that is, $x_i \approx D\alpha_i$. According to the principle of sparse representation, the sparse samples D and the reconstruction coefficient $\alpha$ can be calculated through minimization of below formula:

$$\sum_i \|x_i - D\alpha_i\|_2^2 + \lambda \sum_i \|\alpha_i\|_0 \quad (1)$$

Wherein: the first term denotes the input pixel $x_i$ is reconstructed perfectly by the sparse samples D and the reconstruction coefficient $\alpha$; the zero norms $\|\cdot\|_0$ in the second term denotes the number of nonzero terms in the coefficient vector $\alpha$ showing that the reconstruction coefficient $\alpha$ is highly sparse.

Step 3: to reconstruct each pixel of the input images or videos through a small number of the original sparse samples to calculate the coefficient of reconstruction $\alpha$.

This step can be calculated from Formula (1). It is noted that: the sparse samples D and the reconstruction coefficient $\alpha$ can be calculated from Formula (1) simultaneously. However, during the actual implementation, in order to realize the purpose of saving memory, the sparse samples D is firstly calculated out before the reconstruction coefficient $\alpha$ is calculated. The specific steps of calculation can refer to FIG. 3.

The number of the selected sparse samples to reconstruct each pixel is self-adaptive with a principle that a minimum quantity of samples are used to reconstruct the original pixel. It is specifically denoted in the second term $\|\cdot\|_0$ in Formula (1) indicating the number of non-zero terms of $\alpha$. The minimization of the formula shows that the number should be as small as possible so as to realize the purpose of saving memory space. The calculated reconstruction coefficient establishes a linear relation between the input pixel and the original sparse samples which ensures the fidelity of the result.

Step 4: to edit and propagate the original sparse samples to yield the result of sparse samples;

Herein, X is used to denote the input data; Y is used to denote the corresponding output result. D is used to denote the sparse samples acquired from X and $\tilde{D}$ to denote the result of new sparse samples of D after editing and propagation. Because the input data can be linearly expressed by the sparse samples D and the reconstruction coefficient $\alpha$: $x_i \approx D\alpha_i$, so it can be said that only the sparse samples D are needed to be edited which is equivalent to edit all the input data. Moreover, because the size of the sparse samples D is far smaller than the quantity of pixels of the input data X, so it can realize the purpose to solve a large-scale data with a smaller memory.

The process of editing and propagation is realized through minimization of the formula (2) as follows:

$$\mathrm{argmin}E = \gamma_1 E_1 + \gamma_2 E_2 + \gamma_3 E_3 \quad (2)$$

Wherein:

$$E_1 = \sum_{i \in S} (\tilde{d}_i - g_i)^2$$

$$E_2 = \sum_i \left(\tilde{d}_i - \sum_{\tilde{d}_{ij} \in N_i} w_{ij} \tilde{d}_{ij}\right)^2$$

$$E_3 = \sum_i \|y_i - \tilde{D}\alpha_i\|_2^2$$

The first term $E_1$ ensures the effect of user's editing; the second term $E_2$ maintains a linear relation among various samples during editing and propagation; the third term $E_3$ is the sparse representation term to maintain the relation between the original data and the sparse samples.

During the process of editing and propagation, different editing can be carried out on the same sparse samples to yield different results and hence achieve different purpose of application.

The present invention introduces three different types of applications for the specific description, including the interactive recoloring of video objects, the conversion of color style of video scene and the seamless integration of object and scene.

Figure 4:
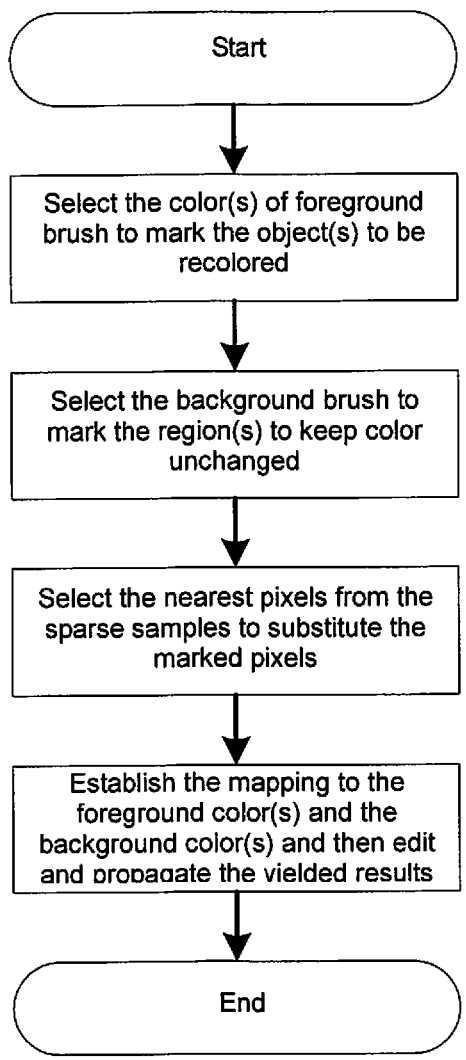
FIG. 4 is the flowchart of interactive recoloring of video object according to the present invention.

With reference to the flowchart of interactive recoloring of video object as shown in FIG. 4, the process of editing and propagation is: to select the color of foreground brush to mark some pixels of the object(s) necessary to be recolored on the images or videos; to select the background brush to mark some pixels of the region(s) without color change on the images or videos; to calculate the Euclidean distance of color between the pixel of the sparse samples and the marked pixels and select the nearest pixel from the sparse samples to substitute the marked pixels to form new marked pixels; to map the marked foreground pixels to the foreground brush color and the marked background pixels to the color of themselves and then propagate the color change to all the sparse samples by means of manifold-preserving editing and propagation.

Figure 5:
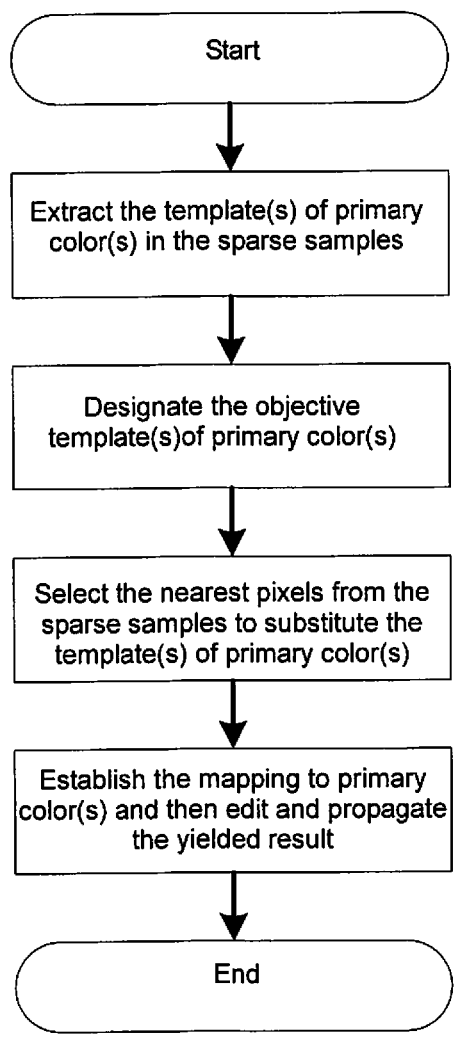
FIG. 5 is the flow chart of conversion of color style of video scene according to the present invention.

With reference to the flowchart of conversion of color style of video scene as shown in FIG. 5, the process of editing and propagation is: to extract the template(s) of primary color(s) of the sparse samples as the original template(s) of primary colors; to designate the objective template(s) of primary color(s); to select the sample(s) from the sparse sample(s) with the nearest Euclidean distance with the color(s) of the template(s) of the primary colors and substitute the template(s) of the primary template(s) to form the new template(s) of primary color(s); establish an one-to-one relationship between the new template(s) of primary color(s) and the objective template(s) of primary color(s) and propagate the color change to all the sparse sample(s) by means of manifold-preserving editing and propagation.

Figure 6:
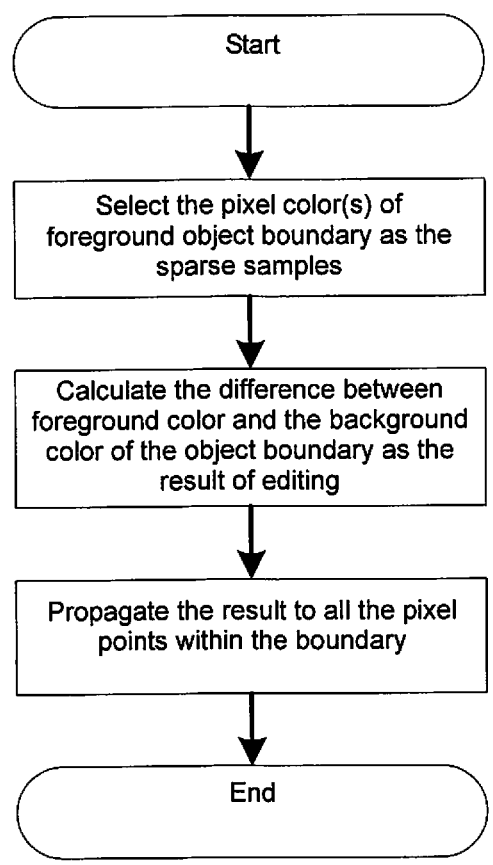
FIG. 6 is the flowchart of seamless integration between object and scene according to the present invention.

With reference to the flowchart of seamless integration of object and scene as shown in FIG. 6, the process is: to select directly the pixel color of foreground object boundary as the sparse sample(s) and calculate the difference between the foreground color and the background color of the object boundary as the editing result so as to directly yield the result of editing and propagation.

Step 5: to generate the result of all the pixels according to the result of sparse samples and the reconstruction coefficient so as to yield the result of high-resolution images or videos.

After the result $\tilde{D}$ of editing the sparse samples is calculated, the coefficient of reconstruction $\alpha$ calculated previously is used to calculate all the output results as $Y \approx \tilde{D}\alpha$.

It is noted that: in order to save memory space, not all the coefficients of reconstruction $\alpha$ are solved at one time. However, the result $y_i = \tilde{D}\alpha_i$ is solve immediately after the $\alpha_i$ of each pixel i is calculated and then the memory space of $\alpha_i$ is released right away. In this way, there is one parameter of the result of sparse samples $\tilde{D}$ residential in the memory. It can be referred to FIG. 3.

Figure 3:
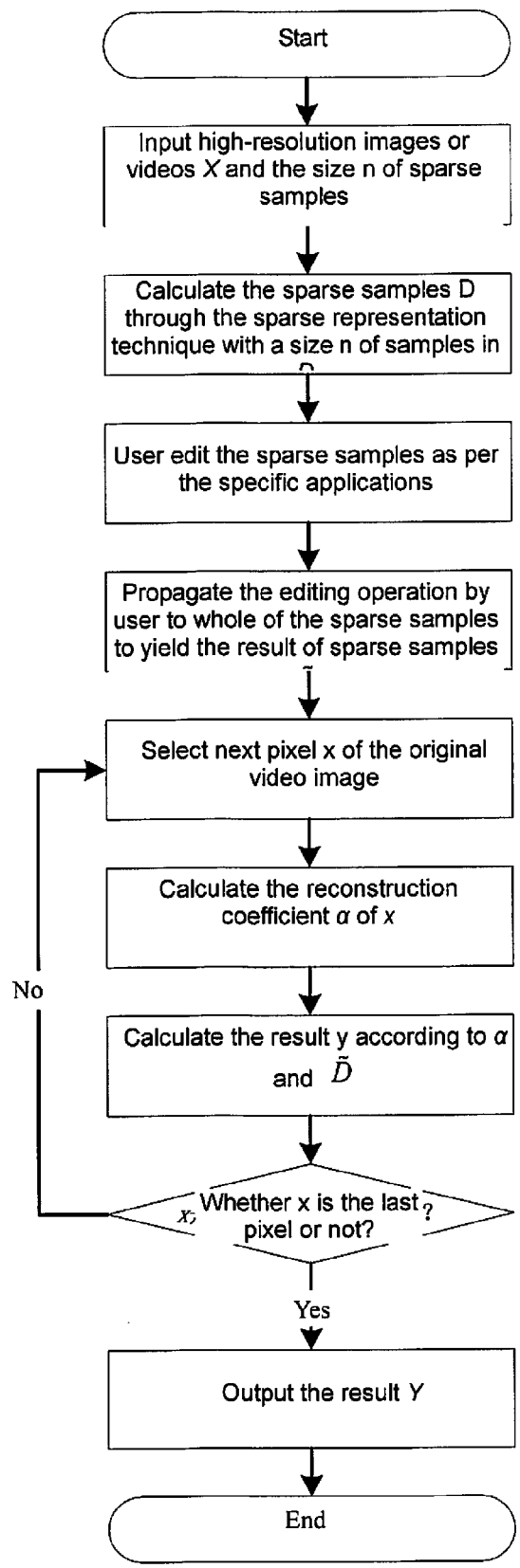
FIG. 3 is the realization flowchart of a specific algorithm according to the present invention.

In order to save as many as memories, the present invention designs and programs to realize a specific algorithm. With reference to the flowchart of algorithm realization as shown in FIG. 3, the steps of specific algorithm are as follows:
(1) Input high-resolution images or videos X and the size of sparse samples n;
(2) Calculate the sparse samples D through the sparse representation technique. The size of samples in D is n;
(3) User edits the sparse samples as per the specific application;
(4) Propagate the editing operation of user to whole of the sparse samples to yield the result of sparse samples $\tilde{D}$;
(5) Traverse all the pixels x of the original images or videos to calculate the reconstruction coefficients $\alpha$ and then calculate the result y from $\alpha$ and $\tilde{D}$;
(6) Output the result Y.

This algorithm saves the memory consumption to a very high degree. The size n of the sparse samples D in Step (2) is given manually and usually between 200-1000. Thus, any size of image or video can be compressed into 200-1000 samples for solving and only a memory of 5-20 MB will be needed. The editing by user in Step (3) is sparse and needs no extra memory space. The editing and propagation in Step (4) is carried out on the sparse sample D and hence only a very small memory is needed. In Step (5), a cyclic method is used to traverse each pixel and the solving of single pixel consumes very small memory which can be negligible. It can also be run in parallel in a multi-core computer to save the time. In conclusion, the memory consumption according to the present invention depends mainly on the size n of the sparse samples D and they can be controlled manually.

These introduced above are only some basic descriptions of the present invention. Any equivalent transformation according to the technical solution of the present invention shall belong to the scope protected by the present invention.

What is claimed is:

1. A method of sparse representation of contents of high-resolution video images which supports content editing and propagation, characterized in that the specific steps thereof comprise:
inputting the original high-resolution images or videos and summarizing the characteristic information of their pixels and remove the pixels of same characteristics;
acquiring the highly sparse samples of the original images or videos through the sparse representation technique; utilizing 11 basic colors to classify the pixels of the original images or videos into 11 types in terms of the Euclidean distance between the pixel color and each of 11 basic colors; extracting separately the sparse samples from each of 11 types of pixels which can represent its nature feature and then combining 11 sparse samples acquired into the final sparse sample which contains the nature features of all the pixels of the original images or videos;
reconstructing each pixel of the input images or videos through a small number of the original sparse samples to calculate the coefficient of reconstruction; the number of the selected sparse samples to reconstruct each pixel is self-adaptive with a principle that a minimum quantity of samples are used to reconstruct the original pixel and the calculated reconstruction coefficient establishes a linear relationship between the input pixel and the original sparse samples;
editing and propagating the original sparse samples to yield the result of sparse samples;
the editing and propagating of the original sparse samples comprises three methods as follows: interactive recoloring of video object, conversion of color style of video scene and seamless integration between object and scene;
generating the result of all the pixels according to the result of sparse samples and the reconstruction coefficient so as to yield the result of high-resolution images or videos.

2. The method of sparse representation of contents of high-resolution video images which supports content editing and propagation according to claim 1, characterized in that: the summarizing of the characteristic information in the inputting of the original high-resolution images or videos comprises acquiring the RGB color characteristics and the XY position characteristics of a pixel.

3. A method of sparse representation of contents of high-resolution videos images which supports content editing and propagation according to claim 1, characterized in: the "sparse representation technique" described in the acquiring the highly sparse samples is to acquire the sparse samples D and the reconstruction coefficient $\alpha$ through minimization of below formula;

$$\sum_i \|x_i - D\alpha_i\|_2^2 + \lambda \sum_i \|\alpha_i\|_0$$

In the formula above, the first term denotes the input pixel $x_i$ is reconstructed perfectly by the sparse samples D and the reconstruction coefficient $\alpha$; the zero norms $\|\cdot\|_0$ in the second term denotes the number of nonzero terms in the coefficient vector $\alpha$ showing that the reconstruction coefficient $\alpha$ is highly sparse.

4. A method of sparse representation of contents of high-resolution video images which supports content editing and propagation according to claim 1, characterized in that: the "11 basic colors" described in the acquiring the highly sparse samples refer to 11 colors as red, yellow, blue, green, purple, orange, pink, brown, grey, black and white.

5. A method of sparse representation of content of high-resolution video images which supports content editing and propagation according to claim 1, characterized in: the "interactive recoloring of video object" described in the editing and propagating the original sparse samples is a method of editing and propagation which comprises the steps as follows: to select the color of foreground brush to mark some pixels of the object(s) necessary to be recolored on the images or videos; to select the background brush to mark some pixels of the region(s) without color change on the images or videos; to calculate the Euclidean distance of color between the pixel of the sparse samples and the marked pixels and select the nearest pixel from the sparse samples to substitute the marked pixels to form new marked pixels; to map the marked foreground pixels to the foreground brush color and the marked background pixels to the color of themselves and then propagate the color change to all the sparse samples by means of manifold-preserving editing and propagation.

6. A method of sparse representation of contents of high-resolution video images which supports content editing and propagation according to claim 1, characterized in: the "conversion of color style of video scene" described in the editing and propagating the original sparse samples is a method of editing and propagation which comprises the steps as follows: to extract the template(s) of primary color(s) of the sparse samples as the original template(s) of primary colors; to designate the objective template(s) of primary color(s); to select the sample(s) from the sparse sample(s) with the nearest Euclidean distance with the color(s) of the template(s) of the primary colors and substitute the template(s) of the primary template(s) to form the new template(s) of primary color(s); establish an one-to-one relationship between the new template(s) of primary color(s) and the objective template(s) of primary color(s) and propagate the color change to all the sparse sample(s) by means of manifold-preserving editing and propagation.

7. A method of sparse representation of contents of high-resolution video images which supports content editing and propagation according to claim 1, characterized in: the "seamless integration between object and scene" described in the editing and propagating the original sparse samples is a method of editing and propagation which comprises the steps as follows: to select the pixel color of foreground object boundary as the sparse sample(s) and calculate the difference between the foreground color and the background color of the object boundary as the editing result so as to directly yield the result of editing and propagation.

\* \* \* \* \*